United States Patent [19]

Asbaghi

[11] Patent Number: 4,730,363
[45] Date of Patent: Mar. 15, 1988

[54] WIRING GROMMET WITH RETRACTABLE LID

[75] Inventor: Ahmad A. Asbaghi, North Redondo Beach, Calif.

[73] Assignee: Illinois Tool Works, Inc., Chicago, Ill.

[21] Appl. No.: 908,285

[22] Filed: Sep. 17, 1986

[51] Int. Cl.⁴ ............................................. F16L 5/00
[52] U.S. Cl. ..................................... 16/2; 174/153 G; 220/331; 248/56
[58] Field of Search .............. 16/2; 174/65 G, 152 G, 174/153 G; 248/56; 339/43, 44 R, 44 M, 103 B, 103 C; 439/142; 220/331

[56] References Cited

U.S. PATENT DOCUMENTS

| | | | |
|---|---|---|---|
| 3,634,608 | 7/1970 | Buhl et al. | 174/153 |
| 3,783,175 | 1/1974 | Timmons | 174/68 |
| 3,857,136 | 12/1974 | Dean | 16/2 |
| 3,966,073 | 6/1976 | Geisel | 339/44 R X |
| 3,995,764 | 12/1976 | Zagami | 220/331 X |
| 4,192,477 | 3/1980 | Decky et al. | 248/56 |
| 4,233,469 | 11/1980 | Steppe | 16/2 X |
| 4,337,603 | 7/1982 | Davidson | 52/220 |
| 4,344,205 | 8/1982 | Latino et al. | 16/2 |
| 4,490,954 | 1/1985 | Cresti | 52/221 |
| 4,520,976 | 6/1985 | Cournoyer et al. | 248/56 |

Primary Examiner—Fred Silverberg
Attorney, Agent, or Firm—J. P. O'Brien; T. W. Buckman

[57] ABSTRACT

A wiring grommet comprised of three components. A retractable lid is carried by a cylindrical cover which is shaped to closely nest within a cylindrical sleeve body. The retractable lid is attached to the cover by means of protrusions formed at each end of the lid. A recess formed in the underside of the cover and lid is shaped to receive a flange on the cylindrical sleeve body so that the profile of the assembled grommet is smooth and inconspicuous. The lid retracts to an open position which is similarly low in profile.

3 Claims, 11 Drawing Figures

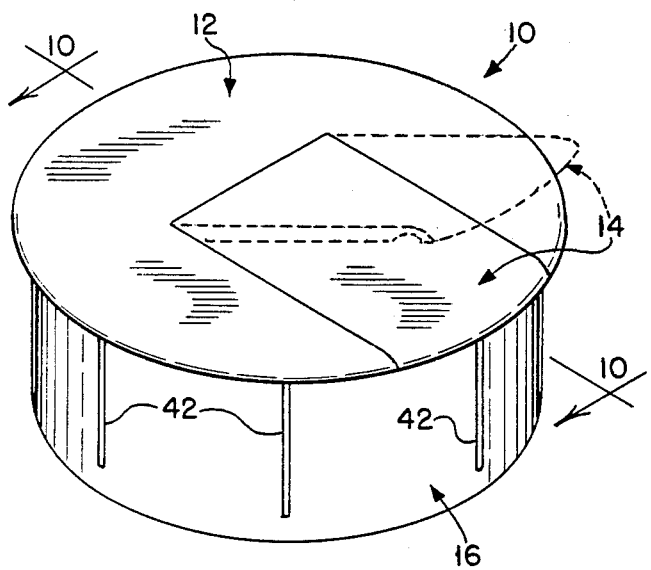
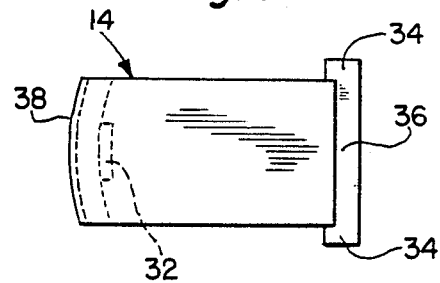
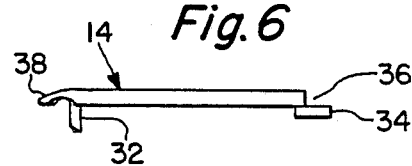
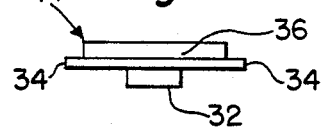
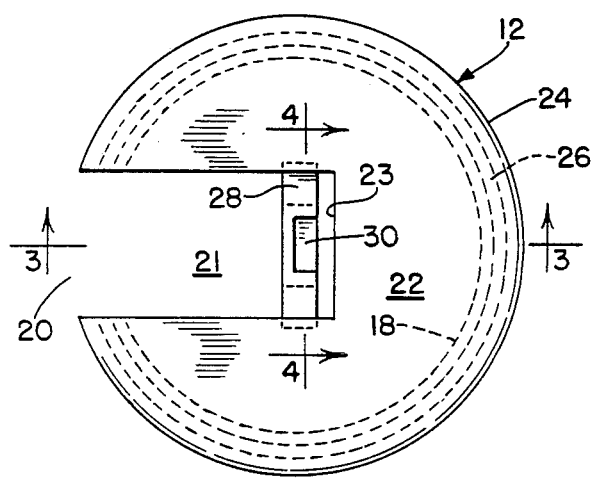
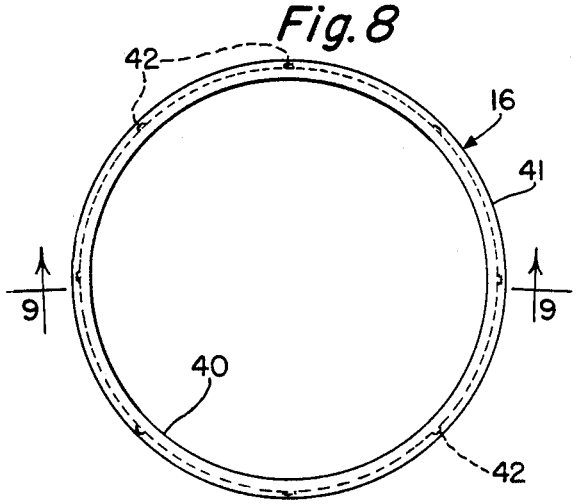
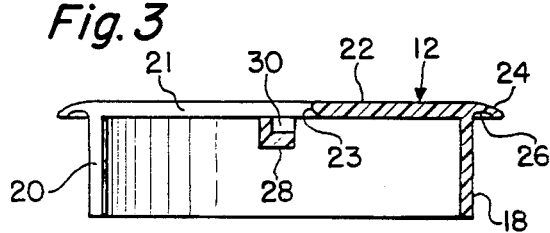
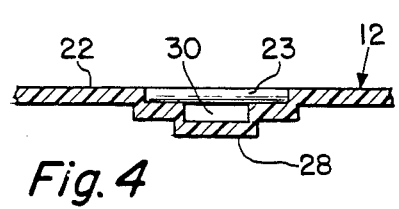
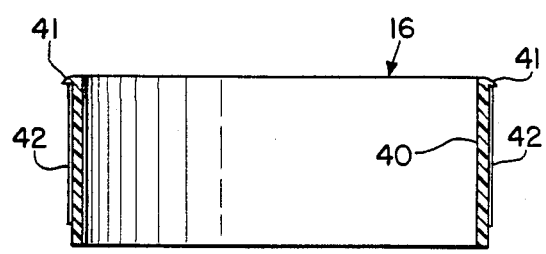

WIRING GROMMET WITH RETRACTABLE LID

BACKGROUND AND SUMMARY OF THE INVENTION

The present invention relates to a device for use in guiding wires as they pass through desks or similar furniture. In particular, the present invention relates to devices with which an aperture in a desk can be selectively opened and closed.

Assemblies for guiding the passage of wires through a planar surface are old in the art. For example, a patent to Timmons, U.S. Pat. No. 3,783,175 shows a two piece assembly with which an aperture in a desk is partially closed. A patent to Latino et al, U.S. Pat. No. 4,344,205, shows a one piece cable pushing with a lid.

The purpose of such devices is to protect the cable as it passes through the opening in the furniture, and to prevent damage to the furniture at the edge of the aperture.

An object of the present invention is to provide a wiring guide having a lid which is relatively inconspicuous in both its open and closed positions.

Another object of the present invention is to provide a wiring guide having a low and smooth profile.

These and other objects of the present invention are achieved with a wiring grommet made of a cylindrical body with a small flange at one end, and a lid member which fits within the cylindrical body and which has a retractable portion capable of moving from a closed horizontal position to an open vertical position. In the open vertical position, the retractable portion of the cover extends within the cylindrical body such that it is relatively inconspicuous. Similarly, in the closed horizontal position, the retractable portion of the cover blends smoothly with the non-retractable portion of the cover such that the entire wiring grommet is relatively inconspicuous.

The above and other features of the invention will be better understood upon a reading of the following specification read in conjunction with the accompanying drawings.

BRIEF DESCRIPTION OF THE DRAWINGS

FIG. 1 is a perspective view of a wiring grommet of the present invention;

FIG. 2 is a plan view of a cover member of the device of the present invention;

FIG. 3 is a sectional view taken along line 3—3 of FIG. 2;

FIG. 4 is a sectional view taken along line 4—4 of FIG. 2;

FIG. 5 is a plan view of a retractable portion of a cover of the present invention;

FIG. 6 is a side elevational view of the retractable portion shown in FIG. 5;

FIG. 7 is an end view of the retractable portion shown in FIGS. 5 and 6;

FIG. 8 is a plan view of a cylindrical body of a wiring grommet of the present invention;

FIG. 9 is a sectional view taken along line 9—9 of FIG. 8;

DETAILED DESCRIPTION OF THE INVENTION

Figure 10:
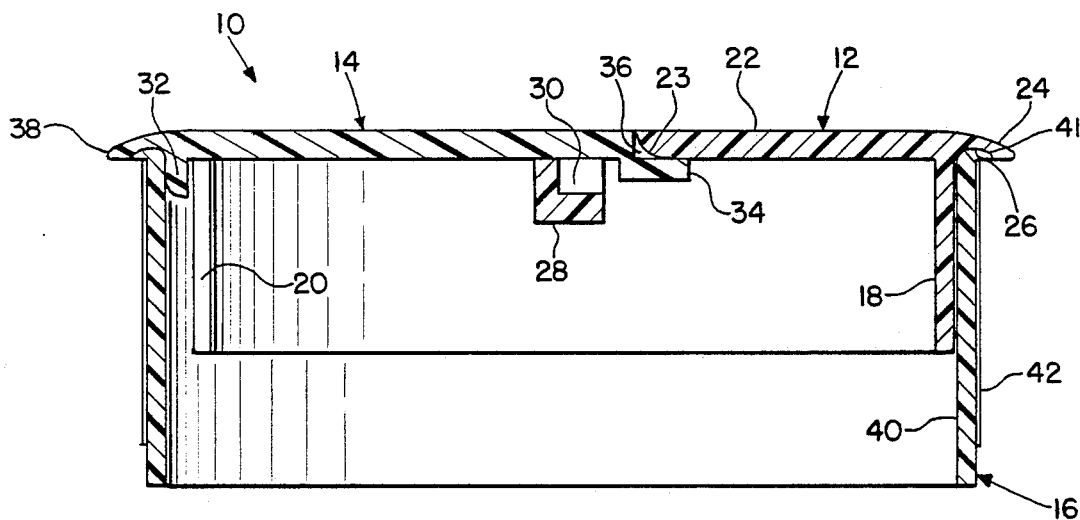
FIG. 10 is a sectional view of an assembled wiring grommet of the present invention taken along line 10—10 of FIG. 1.

The wiring grommet of the present invention is shown in perspective view in FIG. 1, and is generally designated by the numeral 10. The grommet is comprised of three components, a cover 12 shown in FIGS. 2, 3 and 4, having a retractable portion 14 shown in FIGS. 5, 6 and 7, and a cylindrical body 16 shown in FIG. 8 and 9.

The cover 12 is comprised of a generally circular cylindrical sleeve which has a circumferential opening 20 which communicates with an opening 21 in the cover flange 22 formed at one end of the sleeve 18. The cover flange 22 is comprised of an inwardly extending portion which partially closes off one end of the sleeve 18, and an outwardly extending rim 24. A rounded recess 26 is formed on the underside of the rim 24.

A retaining bar traverses the opening 21 in the cover flange 22. A rectangular recess 30 is formed in the retaining bar 28. The retractable portion or lid 14 is snapped into engagement with the cover 12. As shown in FIGS. 5, 6 and 7, the retractable lid 14 includes a tooth 32 to designed to snap passed the retaining bar 28 and nest in the recess 30. The width of the opening 21 in the cover 12 is slightly greater than the width of the lid 14. The distance between the back edge 23 off the opening 21 is slightly less than the length of the tooth 32, so that once the tooth 32 is snapped passed the retaining bar 28 the lid is retained by the cover 12. The underside of the cover flange 22 at the edge 23 is convexly filleted to facilitate rotation of the lid between the open and closed position. Ears 34 prevent removal of the lid in an upward direction. A notch 36 is formed by the offset position of the retaining bar 28 at one end of the lid 14, which allows the lid to assume a position which is coplanar with the cover flange 22. The outer edge 38 of the lid 14 is radiused to the same extent as the rim 24 of the cover 12, and a recess is formed in the outer edge 38 to match the recess 26 formed in the rim 24.

FIGS. 8 and 9 shown of the wiring grommet of the present invention. The body 16 is comprised of a generally straight circular cylindrical sleeve 40 having a small outwardly extending flange or lip 41 formed at one end thereof. The upper surface of the flange 41 is shaped to match the recess 26 in the rim 24 of the cover 12.

FIG. 10 shows the three components of the grommet of the present invention in an assembled condition. In the closed position, the lid 14 is coplanar with the cover flange 22. In this closed position the outer edge 38 of the lid fits over the flange 41, and the entire flange 41 mates neatly with and is covered by the recess 26 formed in the rim 24. Upward movement of the inner portion of the lid is prevented by interference between the ears 34 and the cover flange 22.

Figure 11:
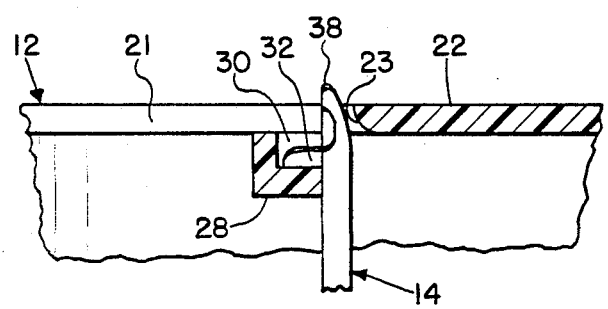
FIG. 11 is a partial sectional view of the cover and retractable portion of the wiring grommet of the present invention.

In the open position, shown in FIG. 11, the lid 14 fully retracts to a position where it is perpendicular to the cover flange 22. The tooth 32 prevents disengagement of the lid from the cover 12. The recess 30 allows the lid to come to rest at a position such that the outer edge 38 projects only a slight amount above the cover flange 22.

The grommet of the present invention has the advantage of being a neat and inconspicuous device which is easy to use. The body and cover of the grommet can be installed in a desk top by the desk manufacturer. Subsequently, the cover can be removed to allow the insertion of an electrical cord. The cover can then be installed around the cord with the lid in the retracted position as shown in FIG. 11. If it is required that the cord be removed, after withdrawal of the cord, the cover can be replaced with the lid in the closed position. In both the open and closed positions the lid and cover combine to form an unobtrusive low profile interrupртion in the surface of the desk.

While a specific embodiment of the invention has been described above in detail, variations and modifications apparent to those skilled in the art are intended to fall within the spirit and scope of the appended claims.

I claim:

1. A wiring grommet comprising a sleeve having a generally hollow cylindrical outer body and an integral outwardly extending lip at one end, said lip joining with said outer body so as not to extend radially inwardly of said outer body, a cylindrical cover having a planar upper portion and an axially extending portion shaped to nest closely within said outer body, an opening formed in said planar upper portion extending from its center portion to its outer marginal edge, a bar extending transversely across said opening adjacent its innermost end to define a slot therebetween, a retractable lid separably and slidably engaged within said slot, said lid having a shape conforming to the shape of said opening but of slightly smaller dimensions to provide a nesting within said opening in the closed position and having a thickness equal to the thickness of said planar upper portion of said cylindrical cover, an offset flange extending from the inner end of said lid on its lower surface, said flange having an ear extending laterally from each end beyond the width of said lid to provide a stop by the ears abutting one of the underside of the lid or the bar for preventing removal of said inner end of said lid from said slot in an outward direction and a protrusion formed on said lower surface of said lid at its outer end to provide a stop by the protrusion abutting the upper surface of the bar for preventing removal of said outer end of said lid from said slot in an inward direction and a gap being formed between said outer end and said innermost end of said slot when said lid is in the open position to permit pivotal movement of said inner end of said lid relative to said slot when said lid is in the said open position.

2. A grommet in accordance with claim 1, wherein said outer end of said lid is fomred with a recess corresponding in shape but of slightly larger dimensions to the cross dimension of said lip of said outer body, said recess being located on said outer end of said lid such that it mates with said lip when said lid is moved to said closed position.

3. A grommet in accordance with claim 1, wherein said innermost end of said opening in said planar upper portion of said cylindrical cover is convexly filleted to facilitate rotation of said lid between said open and closed positions.

* * * * *